UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

TRANSPARENT PYROXYLIN PLASTIC COMPOSITION.

SPECIFICATION forming part of Letters Patent No. 621,433, dated March 21, 1899.

Application filed December 15, 1898. Serial No. 699,313. (No specimens.)

*To all whom it may concern:*

Be it known that I, JOHN H. STEVENS, of the city of Newark, county of Essex, and State of New Jersey, have invented certain new and useful Improvements in Transparent Pyroxylin Plastic Compositions, of which improvements the following is a specification.

My compositions are intended principally for use in the arts as imitations of amber, glass, and tortoise-shell. I have found by a long experience that the essential characteristics for such imitations are solidity, transparency, plasticity under heat or capability of being pressed into different shapes in hot dies or otherwise when in a hard condition, and permanency or resistance to the action of time or elevated temperatures.

While the different ingredients from which I form my compositions are well known and at least one of them has been used or suggested to be used in connection with pyroxylin, they have not, so far as I am aware, been brought into the peculiar new relations which I have demonstrated form a composition possessing entirely new properties of great value in this art. The property of permanency in these transparent compounds is of extraordinary importance, because it is closely associated with the danger of destructive fires and deterioration of valuable goods.

There are plenty of known means for securing stability in non-transparents or even in clouded transparents; but the arts demand a high transparency in order to successfully imitate amber and glass effects, and it has been extremely difficult to secure high transparency and stability at the same time. Hence any composition of matter which gives the desired properties has to depend on study and experiment, especially with proportions, the property of substances, and their behavior under special conditions of manufacture, such as their reaction or compatibility with other necessary ingredients of the transparent compounds.

It frequently happens, as I have already pointed out in my United States Patent No. 519,987, that the mere employment of a substance in connection with pyroxylin does not necessarily disclose its usefulness or the peculiar properties which it may give the compound under various conditions of treatment or in various combinations. This is illustrated in the history of the art. Pyroxylin, which is a product of the action of nitric and sulfuric acids on cellulose either in the form of cotton or paper, is by reason of its solubility in various menstrua a basis for a large variety of compounds whose applications are almost numberless. It is because of these many applications and the peculiar properties demanded for their many uses that inventors have given them so much attention. Many hundreds of patents have been issued both in this country and abroad for various processes, mixtures, and applications in this art. First, the pyroxylin itself has been made by many processes and subjected to various treatments; second, the compounds have been made by numerous special processes; third, liquid solvents in great variety have been discovered and applied; fourth, solid solvents, or solvents which when melted by heat or dissolved in a liquid act on the pyroxylin, have been discovered and used in great variety; fifth, various non-solvent substances have been used to modify the character of the compounds and render them susceptible of special application; sixth, special combinations or the association of old ingredients with new processes have advanced the art, and such is the peculiar nature of pyroxylin and its compounds that these special combinations of known ingredients and their uses with special processes have formed one of the most important fields for improvement, and, seventh, the applicability of special compounds to particular uses have formed the basis of numerous inventions.

The present invention is based upon the discovery of new properties in certain solid bodies not necessarily in themselves solvents of pyroxylin and also in their action with other ingredients and the necessary proportions to be used, and its place in this field is best understood by referring to the history of a somewhat similar line of invention. Thus by some inventors certain inorganic salts have been proposed to to be used to render pyroxylin compounds non-inflammable. Examples of such salts, for instance, are chlorid of calcium, chlorid of zinc, &c.; but in order to effect such result they must necessarily of be used in large proportions to the amount pyroxylin present. So, also, some other salts, such as chlorate of potash and nitrate of soda, have been added by some inventors to the explosive varieties of nitrocellulose in order to increase the explosive power. Still again, certain salts have been proposed to be used when added to non-solvents of pyroxylin, like ethyl alcohol, in order to make the mixture a solvent of pyroxylin; but none of these uses is in any way analogous to my invention, which relates solely to the discovery that certain salts when added to pyroxylin compounds in certain proportions have the effect of neutralizing the nitrous acid developed in such compounds, and thereby tend to preserve these compounds from deterioration, while at the same time they do not interfere with the transparency of the compound, which is so desirable for many purposes. That the discovery of the utility of the salts mentioned in this application for this purpose is foreign to the various inventions of prior inventors recited above is shown by the fact that many of the inorganic salts and equivalent substances mentioned by them as useful for the several purposes above mentioned are wholly unsuited for the purpose of my invention.

The salts that I refer to and which are included within my invention are known as the "magnesium" salts of the volatile monatomic fatty acids. The principal acids of this group are formic, acetic, propionic, butyric, and valeric acids. The salts resulting from the chemical combination of these acids with magnesium are magnesium formate, magnesium acetate, magnesium propionate, magnesum butyrate, and magnesium valerate. These are the salts which form one part of my new transparent composition of matter, consisting, essentially, of pyroxylin, camphor, a liquid solvent, and an antacid or preserving substance, and of these salts I prefer magnesium acetate. I have used these salts successfully and have determined by experiment their relative value for the purpose. While they all possess more or less antacid power, I prefer to use the salts which are most easily soluble, especially in alcohol or wood spirit, because these are the solvents most commonly used in the art. While an ordinary mechanical mixture of the preserving agent with the pyroxylin compounds is sufficient to impart stability, the employment of a solution of the salt permits a better distribution, so that every part of the pyroxylin compound is protected by reason of intimate contact with the salt.

In making my new composition I mix soluble pyroxylin with a liquid solvent and sufficient camphor to give the final product molding properties. The liquid solvent is preferably wood-alcohol and is used in sufficient proportion to produce a mass which can be masticated in the rollers or mixing machinery, although I do not confine myself to any particular proportion so long as the final result is a solid transparent compound. I introduce the antacid salt, preferably in solution, in wood spirit, although it can be introduced in the form of powder, in which case the mastication with the solvent and other ingredients results in a thorough incorporation of the salt. This mastication is specially useful when ninety-five-per-cent. alcohol is employed, because the acetate of magnesium is for practical purposes insoluble in ethyl alcohol of the ordinary strength. The well-known menstruum (acetate of methyl) can be used in place of wood spirit, if desired, or, in fact, any good solvent which will dissolve the antacid salt or permit it to become incorporated with the pyroxylin.

As to proportions, I find that one per cent. of the salt, by weight, to the pyroxylin is sufficient for good results, while not more than three per cent. should be used. I have discovered in operating with these salts that those which dissolve most readily in the solvent used to form the compounds are the most powerful in their preserving effects. The formate of magnesium is more feeble in antacid power than the acetate and is less easily soluble. The rest of the salts mentioned give good transparency, especially under the conditions hereinafter described. Nevertheless the formate of magnesium is a fair antacid and gives moderate transparency, especially when used in thin sheets of pyroxylin compounds.

The propionate, butyrate, and valerate of magnesium are powerful antacids. The butyrate and valerate have a more or less offensive odor, which is absent in the other salts. All of these salts, with the exception of the formate, seem to be, proportion for proportion, superior to urea as preservers. While products made with them are more inclined to yellowness than urea-pyroxylin compounds, they possess the elements of efficiency and cheapness. The yellowness imparted by magnesium acetate, however, is of so moderate a degree that it does not prevent its application to all the purposes to which these compounds are used. I have employed magnesium acetate with considerable success in forming pyroxylin sheets of high transparency and also for an excellent imitation of clear tortoise-shell.

The magnesium salts possess other advantages over some of the antacids heretofore used. For instance, pyroxylin compounds made with urea are sometimes contaminated by a product resulting from the reaction between the urea and the nitro element present. This product is presumably nitrate of urea. At any rate compounds made with urea when subjected to severe treatment, like heat in connection with metal plates, are liable to a smearing of the surface of the sheets and a smutching of the polishing-plates or metal dies. Urea-pyroxylin compounds are also apt to blister easily under heat and change color. In using these salts, especially those stated to be preferred, like magnesium acetate, these defects do not occur, and imitation-tortoise-shell sheets, for instance, made with magnesium acetate as the preserving agent present a better surface and the polishing-plates last longer than is the case with urea compounds. The magnesium-acetate mixtures also remain homogeneous under heat.

The art of manufacturing transparent pyroxylin compositions is well known, as is also the difficulty which the operators have experienced in making these compositions so that they would be unchangeable by time or the influence of elevated temperatures, such as are used in molding. Many antacid substances have been used for this purpose, but as a rule they have failed to give the requisite transparency, either by lack of solubility in the menstrua employed or non-compatibility in other respects.

While I only confine myself to the proportions and ingredients necessary to produce solid transparent compositions, I would state that good proportions are, by weight, one hundred parts of soluble pyroxylin, forty to fifty parts of camphor, fifty to seventy-five parts of wood spirit, and one part of magnesium acetate. I have discovered that solvents in which the magnesium acetate is insoluble can be used with the compound provided the antacid salt is first dissolved in wood spirit. I have also discovered that camphor, which by itself is incompatible with these magnesium salts, is entirely compatible with them when used as described. There is no separation nor consequent cloudiness, which would be fatal to the effects desired. I prefer the roll method of conversion. I confine myself to using no more than three per cent. of the magnesium salt to the amount of pyroxylin. More than this would make a compound unsuited for my purposes, as it would either lack the requisite transparency or possess other undesirable properties. For instance, I find that five per cent. to the pyroxylin of the magnesium acetate forms a decidedly clouded material. As a rule I would recommend the use of one per cent. as a good general proportion, especially as one per cent. gives the palest effects and better transparency than larger proportions. Less than one per cent. of the magnesium salt to the pyroxylin will give less stability.

As regards the effect of proportion on the transparency I find that, considering formate as the first of a series consisting of formate, acetate, propionate, butyrate, and valerate, this ability to hold transparency with larger proportions (say, two per cent. and upward to three per cent.) increases gradually as we rise in the series. The formate, for instance, is perceptibly clouded at two per cent., while the valerate at two per cent. is still highly transparent.

While I am unable to explain why a basic substance already saturated with a corrosive acid can act as a preserving agent and prevent the deleterious action of the corrosive nitro compounds in decomposing pyroxylin, my experiments have, nevertheless, demonstrated this to be a fact. I can only state that it seems to depend on the nature of the acid or other radical held in combination with the base in the preserving agent. Even when the elements contained in the preserving salt are united to other substances—for instance, in neutral salts of compounds containing dissimilar acid radicals—the resultant compound or salt possesses preserving power at least in proportion approximating to the amount of such element present. I find also that salts containing two or more bases are good preserving substances, according to the properties of their constituents.

As an instance of the effect of the nature of the acid or other radical present in the preserving salts I can state that I have found by experiment that while magnesium acetate is a good preserving substance in connection with pyroxylin, magnesium chlorid has so little antacid power in it that my tests have failed to disclose it, and at any rate it can be considered as totally inefficient as an antacid for my compositions.

Perfect solubility of the salt or compound in the solvent employed and the ability to form highly-transparent effects do not give the salt or compound antacid power, for I have found that the chlorid of magnesium dissolves in wood spirit and forms a close highly-transparent combination with the pyroxylin compounds, while it is of no use for antacid purposes. In fact, hygroscopic substances, as some of the chlorids—for instance, chlorid of calcium—while they may be capable, in connection with alcohol, of making a "celluloid" useful for artificial silk, filaments for lamps, and a certain class of varnishes, are totally incapable of forming a useful imitation of amber, tortoise-shell, or glass having the requisite surface effects. I have long known by experience that chlorid-of-calcium compounds attract moisture and become wet on the surface, which property would prevent the sale of such articles as tortoise-shell combs, amber pipe-bits, or transparent sheets for decorative purposes, for all of which my invention is specially applicable.

While the solution of chlorid of calcium on the surface can be washed away to some extent, it is always liable to exude from the body of the material and form fresh deposits. Such materials are either incapable of polish or will not retain their polish by reason of this exudation.

I am aware that magnesium carbonate has been used as an antacid in pyroxylin compounds. In this case the theory is that the magnesium is combined with a non-corrosive and harmless acid radical, which when released immediately passes off in the gaseous state. The pyroxlin products made with carbonate of magnesium are not transparent, as those made with acetate of magnesium, for instance, and the preserving power of the acetate is higher. Its penetrating power also gives it superiority over the carbonate. The carbonate of magnesium is quite distinct also by reason of insolubility in alcoholic menstrua.

By "solid transparent pyroxylin compounds" I mean those which permit the transmission of light—for instance, sheets, rods, or articles made in imitation of amber, glass, tortoise-shell, and horn.

I am aware that magnesium acetate has been referred to as belonging to a class of salts of which those which are soluble in alcohol are suggested for use, in connection with alcohol, as solvents of tetranitrocellulose to replace camphor and other known solvents of ordinary pyroxylin; but the fact that dry magnesium acetate is practically insoluble in ninety-five-per-cent. ethyl alcohol excludes it from the class of salts described as being soluble in alcohol. Furthermore, magnesium acetate when dissolved in alcohol of such character as to take it up in large quantity, or even when dissolved in wood spirit, fails to show any evidence of solvent power on the pyroxylin commonly employed for transparent compounds, such as those to which my invention relates; but, on the contrary, it weakens the solvent action of such solvent menstrua. I am not aware, therefore, that the acetate of magnesium has ever been used in making a plastic or moldable imitation of glass, horn, amber, or tortoise-shell, or that it has been used in such proportions as would form such a composition, or that any one before my experiments and the reduction to practice of this invention has known or described the valuable preservative property of magnesium acetate in my compounds or even suggested its utility with camphor.

While I have found that magnesium acetate and the rest of my new group are applicable as antacids for purposes outside of the transparent pyroxylin compounds of the present invention—for instance, smokeless powders and lacquers—nevertheless as there are other suitable antacids useful for non-transparent compounds and because of the extraordinary utility of these new antacid substances in solid transparent moldable compounds I have confined my claims to this class of compounds.

Wherever I have mentioned "camphor" it is to be understood that I can employ any equivalent solid solvent which will give the compound the molding property or the property of plasticity under heat, as is well understood. Many such substances are known. I do not claim the broad use of these new antacid substances with pyroxylin in all proportions, but I include in my invention any use of my proportions of magnesium acetate or the rest of the group in a solid transparent camphor-pyroxylin compound as a practice of my invention whether the compound is made as I have described or by adding to an ordinary transparent camphor-pyroxylin compound sufficient alcohol and acetate of magnesium to give my proportions and results, for I have found that the usefulness of the acetate of magnesium as an antacid in my compounds was unknown in the art until I made my invention.

For the reasons above described I include in my invention the present group of magnesium salts of the volatile monatomic fatty acids as preserving agents for transparent pyroxylin compounds whether the salts are simple, compound, mixed, or combined chemically with other salts or compounds; but I exclude any combination of the salts of this specification with the halogen acids, for such compounds have already been secured by me in United States Patent No. 614,514, of November 22, 1898, which patent includes such substances, for instance, as chlroformate of magnesium, chloracetate of magnesium, chlorchlorpropionate of magnesium, &c.

Having thus fully described my invention, what I claim, and desire to secure by Letters Patent, is—

1. A solid transparent composition of matter consisting of pyroxylin, camphor, a liquid solvent, and a preserving magnesium salt of a volatile monatomic fatty acid, the said salt being present to no greater extent than three per cent. by weight to the amount of pyroxylin in the compound, substantially as described.

2. A solid transparent composition of matter consisting of pyroxylin, camphor, and a preserving magnesium salt of a volatile monatomic fatty acid, the said salt being present to no greater extent than three per cent. by weight to the amount of pyroxylin in the compound, substantially as described.

3. A transparent composition of matter containing pyroxylin, camphor and magnesium acetate, the said salt being present to no greater extent than three per cent. by weight to the amount of pyroxylin in the compound, substantially as described.

JOHN H. STEVENS.

Witnesses:
ABRAHAM MANNERS,
RALPH ROOKSBY.

It is hereby certified that in Letters Patent No. 621,433, granted March 21, 1899, upon the application of John H. Stevens, of Newark, New Jersey, for an improvement in "Transparent Pyroxylin Plastic Compositions," errors appear in the printed specification requiring correction, as follows: On page 2, line 2, after the word "amount" the word *of* should be inserted; page 4, line 88, the word "chlroformate" should read *chlorformate*, and same page, line 89, the syllable "chlor-" should be stricken out; and that the said Letters Patent should be read with these corrections therein that the same may conform to the record of the case in the Patent Office.

Signed, countersigned, and sealed this 28th day of March, A. D., 1899.

[SEAL.]
                WEBSTER DAVIS,
                 *Assistant Secretary of the Interior.*

Countersigned:
 C. H. DUELL,
  *Commissioner of Patents.*